United States Patent
Zhou et al.

(10) Patent No.: US 8,442,002 B2
(45) Date of Patent: May 14, 2013

(54) METHOD FOR OPERATING A MULTI-CELL RADIO SYSTEM AND A MULTI-CELL RADIO SYSTEM

(75) Inventors: Jun Zhou, London (GB); Linghang Fan, Surrey (GB); Yuefeng Zhou, Oxshott (GB); Tetsu Ikeda, Kawasaki (JP)

(73) Assignees: NEC Europe Ltd., Heidelberg (DE); NEC Corporation, Tokyo (JP)

( * ) Notice: Subject to any disclaimer, the term of this patent is extended or adjusted under 35 U.S.C. 154(b) by 147 days.

(21) Appl. No.: 13/062,528

(22) PCT Filed: Sep. 7, 2009

(86) PCT No.: PCT/EP2009/006480
§ 371 (c)(1), (2), (4) Date: May 11, 2011

(87) PCT Pub. No.: WO2010/025953
PCT Pub. Date: Mar. 11, 2010

(65) Prior Publication Data
US 2011/0222496 A1    Sep. 15, 2011

(30) Foreign Application Priority Data

| Sep. 5, 2008 | (EP) | 08252962 |
| Oct. 27, 2008 | (EP) | 08253490 |
| Jul. 6, 2009 | (EP) | 09251742 |

(51) Int. Cl.
*H04W 4/00* (2009.01)
*H04L 12/28* (2006.01)
*H04J 4/00* (2006.01)
*H04J 1/00* (2006.01)

(52) U.S. Cl.
USPC ...... 370/330; 370/395.21; 370/436; 370/478; 370/480

(58) Field of Classification Search ...................... None
See application file for complete search history.

(56) References Cited

U.S. PATENT DOCUMENTS

| 2007/0177501 A1 | 8/2007 | Papasakellariou | |
| 2007/0223606 A1* | 9/2007 | Yang et al. | 375/260 |
| 2009/0081955 A1* | 3/2009 | Necker | 455/63.1 |
| 2009/0129401 A1* | 5/2009 | Kang et al. | 370/431 |
| 2009/0186621 A1* | 7/2009 | Umeda et al. | 455/446 |
| 2009/0245197 A1* | 10/2009 | Ma et al. | 370/330 |
| 2011/0034192 A1* | 2/2011 | Lim et al. | 455/501 |

FOREIGN PATENT DOCUMENTS

| EP | 1 418 776 A1 | 5/2004 |
| EP | 1 549 093 A2 | 6/2005 |

OTHER PUBLICATIONS

International Search Report, dated Feb. 2, 2010, from corresponding PCT application.
Alexander L. Stolyar et al., "Self-organizing Dynamic Fractional Frequency Reuse in OFDMA Systems", The 27th Conference on Computer Communications, IEEE, Apr. 13, 2008, pp. 691-699; Cited in International Search Report.

* cited by examiner

*Primary Examiner* — Gregory Sefcheck
*Assistant Examiner* — Ashley Shivers
(74) *Attorney, Agent, or Firm* — Young & Thompson (57) ABSTRACT

For enhancing user throughput and coverage within a multi-cell radio system a method for operating a multi-cell radio system, especially an OFDMA-based radio system including a plurality of base stations, wherein different frequency reuse factors are used within different reuse zones of one cell by a fractional frequency reuse (FFR) scheme, the method includes the following steps: allocating a size or resource to the different reuse zones, and allocating users into different reuse zones. Further, a multi-cell radio system is described, preferably for carrying out the above mentioned method.

17 Claims, 9 Drawing Sheets

Fig. 1

(a) Structure A (b) Structure B

Flow chart of statistic fractional reuse

Flow chart of dynamic fractional reuse

Fig. 6

Flow chart of adaptive user allocation

METHOD FOR OPERATING A MULTI-CELL RADIO SYSTEM AND A MULTI-CELL RADIO SYSTEM

The present invention relates to a method for operating a multi-cell radio system, especially an OFDMA-based radio system, comprising a plurality of base stations, wherein different frequency reuse factors are used within different reuse zones of one cell by means of a fractional frequency reuse (FFR) scheme. Further, the present invention relates to a multi-cell radio system, especially an OFDMA-based radio system, the system comprising a plurality of base stations, wherein different frequency reuse factors are used within different reuse zones of one cell by means of a fractional frequency reuse (FFR) scheme.

In a multi-cell OFDMA-based radio system, user throughput and coverage are limited by inter-cell interference, especially for the users near cell-edge (OFDMA: Orthogonal Frequency Division Multiple Access). A larger frequency reuse factor can be used to reduce co-channel inter-cell interference. However, it will lead to increase of required spectrum resource and lower spectrum efficiency. The fractional frequency reuse (FFR) scheme is trying to achieve the trade off between user throughput and system throughput.

Figure 1:
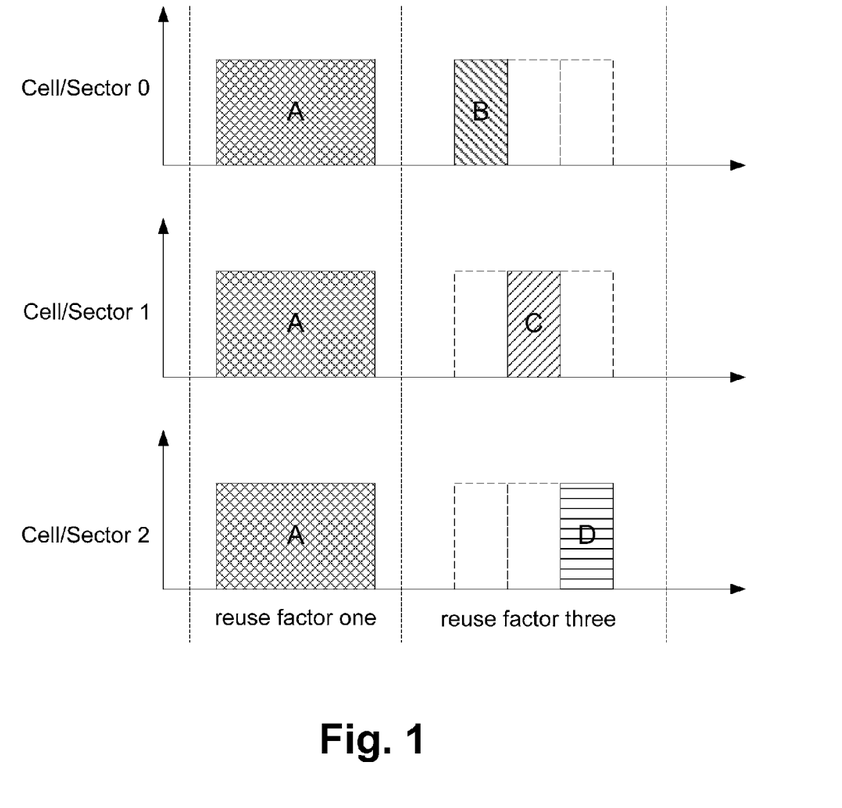
FIG. 1 is illustrating different cell structures with reuse factor one and reuse factor three.

Fractional frequency reuse is a kind of cellular structure, where different frequency reuse factors are used in one cell. The key idea behind FFR is allocating user to different reuse factor zone according to the interference and channel state information, shown in FIG. 1, where A={B,C,D}. In FIG. 1, only reuse factor one and reuse factor 3 are considered. In each cell/sector, users with lower co-channel interference (CCI) can be allocated to reuse-one zone, and otherwise they should be allocated to reuse-three zone.

Some previous works have been done for FFR with OFDMA-based systems. However, their studies are based on analysis and no work considers how to implement FFR in real system. For example, within "Mobile WiMAX—Part 1: A technical overview and performance evaluation", WiMAX Forum, June 2006, fractional frequency reuse is considered in connection with OFDMA-based systems.

It is an object of the present invention to improve and further develop a method for operating a multi-cell radio system and an according multi-cell radio system for enhancing user throughput and coverage.

In accordance with the invention, the aforementioned object is accomplished by a method comprising the features of claim 1. According to this claim 1 the method is comprising the following steps: allocating a size or resource to the different reuse zones, and allocating users into different reuse zones.

Further, the aforementioned object is accomplished by a multi-cell radio system according to claim 14. According to this claim 14 a size or resource is allocated to the different reuse zones and users are allocated into different reuse zones, and preferably a block or frame structure suitable for fractional frequency reuse (FFR) is defined.

According to the invention it has been recognized that the combination of the allocation of a size or resource to the different reuse zones and the allocation of users into different reuse zones will enhance known multi-cell radio systems with regard to user throughput and coverage.

It should be noted that within 16m or 802.16m scenarios the term "zone" is no longer used and the term "subframe" is used instead of "zone". However, this will generally mean the same structural feature.

Preferably, the method is further comprising the step of defining a block or frame structure suitable for fractional frequency reuse (FFR).

Preferably a whole band or a part of a whole band is divided into several sub-bands. This will enable an easy implementation of FFR into OFDMA-based systems.

Two kinds of block or frame structure for fractional frequency reuse are preferred. Preferably, one block or frame is divided into n reuse zones, where n=1, .... Within one further preferred structure a head information is added to the beginning of the block or frame. This structure can be efficient if all the zones have the same or almost the same head information.

Alternatively, each reuse zone has its own head information. In this case it is easy to control every zone by a base station.

For each reuse zone, also two kinds of structures are preferred, one is a frequency division structure and the other is a time division structure. The difference between the two structures is the allocating of sub-zones in frequency domain or time domain.

Within a further preferred structure each reuse zone has Km sub-zones, wherein Km is the reuse factor of reuse zone m, m=1, ..., n.

Further, for each sub-zone i in reuse zone m, $k_{m,i}$ sub-channels are allocated to it. These $k_{m,i}$ sub-channels can be allocated continually or discretely according to different allocating approaches. Within the afore mentioned structure i=1, ..., Km.

With regard to the step of allocating a size or resource to the different reuse zones there is preferred a static reuse zone size allocation and more preferred a dynamic reuse zone size allocation.

Within the present invention it is assumed that for long term view, the statistical characteristics of users in one sector or cell will not change. Therefore the average value of resource for each zone should not be changed.

The static resource allocation is comprising two important steps. Within a first step a higher network layer loads a size or resource allocation information from a database, and then informs each base station what size or resource has been allocated to them, respectively. This size or resource allocation information comes from long term statistical process and will update very slowly.

Within the second step at least one and preferably each base station allocates users to different reuse zones according to user's channel state information, and preferably then adds corresponding information to database for further update.

The mature benefit of static reuse zone size or resource allocation is that it is easy to implement. However, to achieve a good performance, the higher layer has to do a long time statistic to obtain suitable size or resource allocation information.

The dynamic reuse zone size or resource allocation is comprising as a first step the loading of size or resource allocation information from a database by a higher network layer as within the static allocation process. Further, the higher network layer informs each base station what size or resource has been allocated to them, respectively. In a preferred situation, the base stations are allocated equal sizes or resources, which means for zone j, $k_{j,1}=k_{j,2}=\ldots=k_{j,Kj}$ as the number of subchannels.

As a second step at least one and preferably each base station allocates users to different reuse zones, preferably according to an adaptive user allocation method. This user allocation approach firstly tries to classify users into n groups, and then allocates each group to a corresponding zone. The detail of the preferred adaptive user allocation approach will be discussed later.

Within a third step at least one and preferably each base station collects resource usage metrics for each frame or block for compiling statistics, and then reports statistical results to the higher network layer every $L^{th}$ frame or block, $L=1, \ldots$. With regard to a very effective size or resource allocation the statistical results could include the number $U_k$ of users which have been allocated to zone k and/or the number $V_k$ of users which have been tried to be allocated to zone k by user allocation method. The value reported to higher network layer can be the average value of $U_k$ and $V_k$ across L blocks or frames, noted as $X_k$ and $Y_k$, respectively. In this case 2n values need to be reported to higher network layer every L blocks or frames.

Within a fourth step the higher network layer adapts the size or resource of each zone according to current and/or historical value of metrics and/or statistical results.

Within the fifth step the higher network layer could adapt the sub-zone size or resource of each zone preferably according to metrics obtained from all the base stations.

In the following the adaptive user allocation which is preferred within the second step of the above dynamic reuse zone size or resource allocation, will be discussed. The purpose of the adaptive user allocation is to allocate users into different reuse zones and thus to improve the system performance.

Within a first step of the adaptive user allocation at least one and preferably each base station asks users to report metrics, preferably via broadcast channel. In a preferred situation these metrics could include the preamble carrier to interference and noise ratio (CINR) of different zones.

Within a second step the users could report the metrics to the respective base stations, preferably through uplink feedback channel.

Within the third step the at least one and preferably each base station could allocate the users to different zones according to the reported values of metrics. For effective allocation of the users to different zones three kinds of procedures A, B and C are preferred.

Procedure A is based on a maximum SINR (Signal to Interference and Noise Ratio) ratio. The user allocating step on the basis of two different reuse zones—zone one with a lower reuse factor and zone two with a higher reuse factor—could comprise: (a) Calculating of the metric $r_i$=SINR1/SINR2, where SINR1 is the estimate of the average CINR over all subcarriers of the preamble except the guard subcarriers and the DC subcarriers and SINR2 is the estimate of the average CINR over only the modulated subcarriers for the preamble, (b) classifying of the users in two different groups, depending on the relation $r_i$<Th (group one) or $r_i \geq$Th (group two), where Th is a definable threshold, (c) sorting users in group two by SINR2 in descending order, then allocating these users to zone two from the user with highest SINR2, then, if all users in group two have been allocated, selecting user in group one with highest SINR2 and allocating it to zone two till all the resource in zone two has been used and, if there are any users which have not been allocated resource, classifying them to group one, and (d) sorting users in group one by SINR1 in descending order, and then allocating them to zone one from the user with highest SINR1 until all users have been allocated resource or all the resource has been used up.

Preferably, procedure A can also be based on n reuse zones.

The procedure B is based on a maximum system throughput. The user allocating step on the basis of two different reuse zones—zone one with a lower reuse factor and zone two with a higher reuse factor—could comprise: (a) Classifying users into group one if there SINR1$\geq$Th_SINR1, and the rest of the users into group two, where Th_SINR1 is the minimum required SINR for using the lower reuse factor; (b) allocating users in group one to zone one from the user with lowest CINR3 and, if there are any users which have not been allocated resource, adding them to group two, CINR3 refers to the CINR measurement made for reuse zone 3 or for zone two; and (c) allocating users in group two to zone two from the user with highest CINR3 until all the users have been allocated or the resource have been used up.

The procedure B can be based on a general concept with n reuse zones. In this case the user allocating step on the basis of n different reuse zones—the reuse factor of the reuse zones is increasing from reuse zone one to reuse zone n—could comprise:

1) All users are allocated to a user pool, and set reuse zone count N=1;
2) Classify the users in the user pool into a group if their SINR$_N \geq$Th_SINR$_N$, and leave the rest of users within the user pool temporarily, where Th_SINR$_N$ is the minimum required SINR for using the reuse zone N;
3) If N$\leq$n−1, allocate users in the group to reuse zone N from the user with lowest SINR$_{N+1}$, where SINR$_{N+1}$ refers to SINR measurement for reuse zone N+1; if N=n, allocate users in the group to reuse zone N from the user with highest SINR$_N$ and if there are any users which have not been allocated resource, add them to user pool;
4) Let N=N+1, and repeat step 2 and step 3 until N>n; when N>n, all the reuse zones have been considered, and this user allocation procedure is finished; if there are any users in user pool, these users will not be allocated resource in this procedure due to their poor channel conditions.

Within procedures A and B, the QoS requirements for each user can also be considered as factor for the allocation of users.

The procedure C is based on a multiple threshold scheme. Thus, a multiple threshold user allocation method could be used.

Within such a multiple threshold user allocation method the user allocating step on the basis of two thresholds and at least two different reuse zones—zone one with a lower reuse factor and zone two with a higher reuse factor—could comprise the following steps:

(1) At least one base station broadcasts a high threshold (THR_HIGH) and a low threshold (THR_LOW) of selected metric to all users, where the selected metric may be CINR1, which can reflect the received signals quality of each user;
(2) The users, according to their values of selected metric, report their interference states or value to the base station, wherein preferably two options are possible for the users to report their interference states to the base station:
Option 1: each user has three choices:
a) Reporting metric state only, where the metric state describes the scope of required metric, preferably it can indicate if the CINR1 is lower than the low threshold (THR_LOW), higher than the high threshold (THR_HIGH), or between THR_LOW and THR_HIGH;
b) Reporting metric value only, such as CINR1; or
c) Not reporting anything.
Option 2: each user has two choices, including above a) and b); and
(3) At least one or the at least one base station allocates the users to different reuse zones according to received interference state or their reported metric or value and preferably QoS requirements.

Within the last mentioned procedure C, the procedure of allocating the users could comprise the following steps:

a) Allocating users with higher value of metric (greater than THR_HIGH) to reuse zone one and, if the resource is not enough to allocate all such users, only allocating the users with a higher priority, where the definition of priority may include QoS, fairness, etc., b) allocating users with lower value of metric (less than THR_LOW) to reuse zone two and, if the resource is not enough to allocate all such users, only allocating the users with the higher priority, and c) allocating the rest of users to remained resource, where preferably the first factor to be considered is priority and the second factor is system throughput or coverage, and d) randomly allocating the users that cannot be compared by value of metric.

Within this procedure C the users which do not report there interference states or value to the base station are classified as very low values of metric by the base station.

As a last step in all adaptive user allocation procedures the at least one and preferably each base station could inform the users to which zones they have been allocated. This information can be transmitted preferably via head information or control channel. After this information step the base station could transmit the whole block or frame.

Reviewing the above method details it is mentioned that the parameters n, m, i, L and j are integers larger than or equal to one.

The present invention is providing a method for designing a proper block or frame structure for FFR, especially for OFDMA systems. Further, the size or the resource of zones with various frequency reuse factors can be decided. Finally, there are provided methods for allocation of users into zones with various frequency reuse factors.

With the present invention support time-division duplex (TDD) structures for reuse zones are possible, which have a strong advantage in the cases where the asymmetry of the uplink and downlink data speed is variable and where the uplink and downlink radio paths are likely to be very similar in the case of a slow moving system. This means that techniques such as beamforming work well with TDD systems. Previous work only considers frequency-division duplexing (FDD) structures.

Compared to static reuse zone size allocation methods the dynamic reuse zone size allocation reduces the overhead and increases the spectrum efficiency and throughputs.

Further, new metrics have been defined to facilitate the adaptive zone size allocation.

The adaptive and dynamic reuse zone size allocation can dynamically adjust zone or resource size according to the sector/cell user-load based on the proposed new metrics.

With the new combined metric the adaptive users' allocation is facilitated. Within prior work only the simple SINR value is considered as the metric. From the new metric, it is easier to decide which zone the user belongs to.

Three novel user allocation methods based on the new combined metric (previous methods do not use this metric) have been proposed. One of the methods tries to achieve the better Bit Error Rate (BER) performance, another one tries to improve the system throughput performance and the third optimizes user resources based on multiple thresholds user allocation methods to reduce the overhead. BER is the number of erroneous bits received divided by the total number of bits transmitted.

As an advantage of the present invention the spectrum efficiency for FFR deployment is increased and flexibility for FFR deployment/implementation is provided Preferably, the present invention will be used for WiMAX and LTE (which are the mainstream technologies for wireless communications), for WiMAX and LTE Femtocell, and for other OFDMA-based systems.

In the present invention, the implementation issues of FFR in OFDMA-based radio systems are discussed. Firstly, two kinds of structures are presented, which can be used for OFDMA systems, such as WiMAX and LTE. Secondly, approaches are proposed to decide how to decide the size of different zones with different reuse factors. Finally, the methods on how to allocate users to different reuse zones are proposed.

There are several ways how to design and further develop the teaching of the present invention in an advantageous way. To this end, it is to be referred to the claims subordinate to claim 1 on the one hand, and to the following explanation of preferred examples of embodiments of the invention illustrated by the drawing on the other hand. In connection with the explanation of the preferred examples of embodiments of the invention by the aid of the drawing, generally preferred embodiments and further developments of the teaching will be explained. In the drawings

Factional frequency reuse (FFR) is a kind of cellular structure, where different frequency reuse factors are used in one cell. The key idea behind FFR is allocating users to different reuse factor zones according to the interference and channel state information, shown in FIG. 1, where A={B,C,D}. In FIG. 1, only reuse factor one and reuse factor three are considered. In each cell/sector, users with lower co-channel interference (CCI) can be allocated to reuse-one zone, and otherwise they should be allocated to reuse-three zone.

Figure 2:
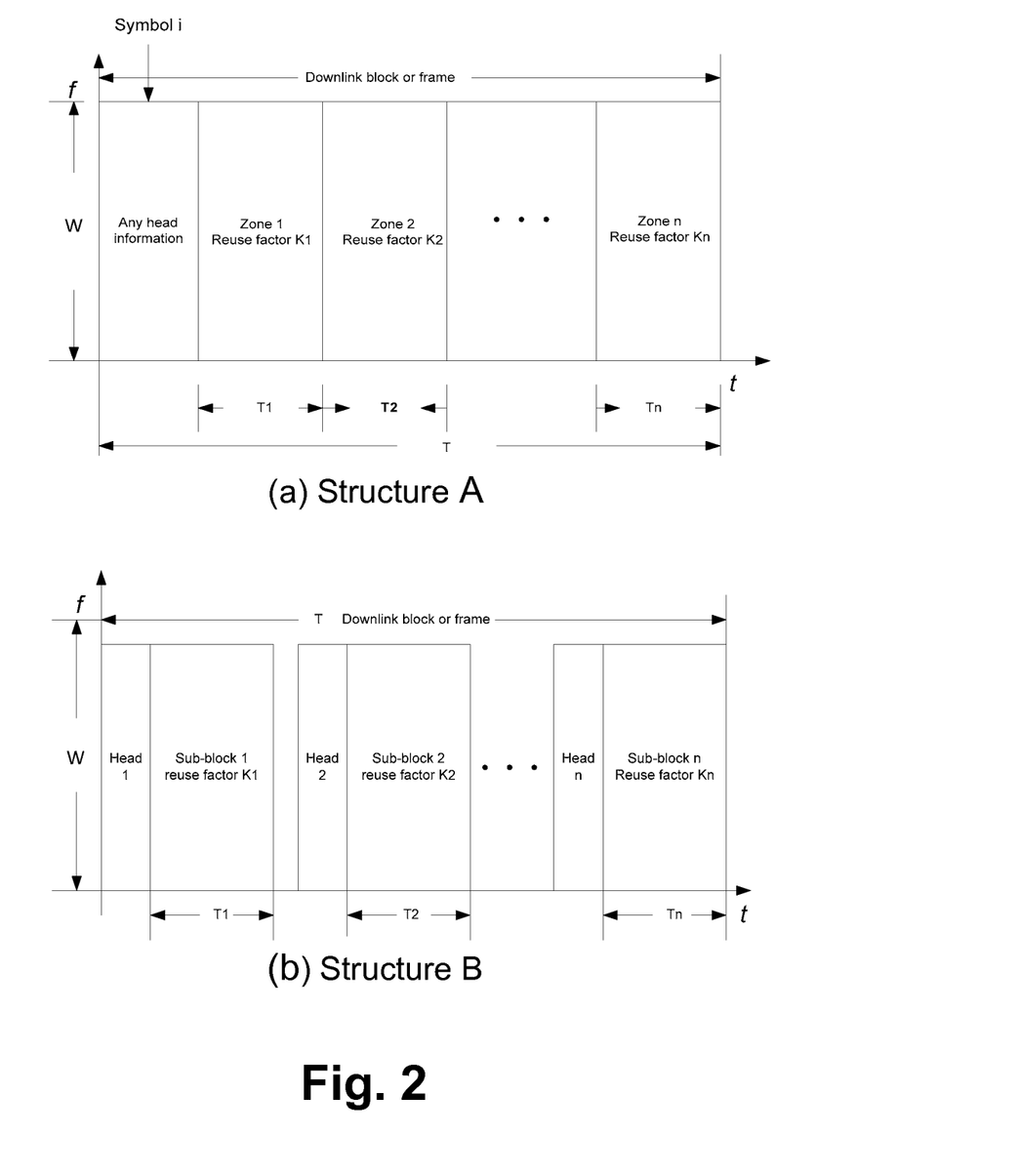
FIG. 2 is illustrating two kinds A and B of block or frame structures for fractional frequency reuse.

Two kinds of block or frame structure for fractional reuse are defined, Structure A and Structure B, shown in FIG. 2 (related to an OFDMA system). Assume that the duration for one block or frame is T. There are n reuse zones in one block and the duration of zone i (data) with reuse factor $K_i$ is $T_i$, from 1 to n. To Structure A, all the head information is added to the beginning of block, and each user has to decode this part. This structure can be efficient if all the zones have same or almost same head information. To Structure B, each zone has its own head information. It is easy to control every zone by base station.

Figure 3:
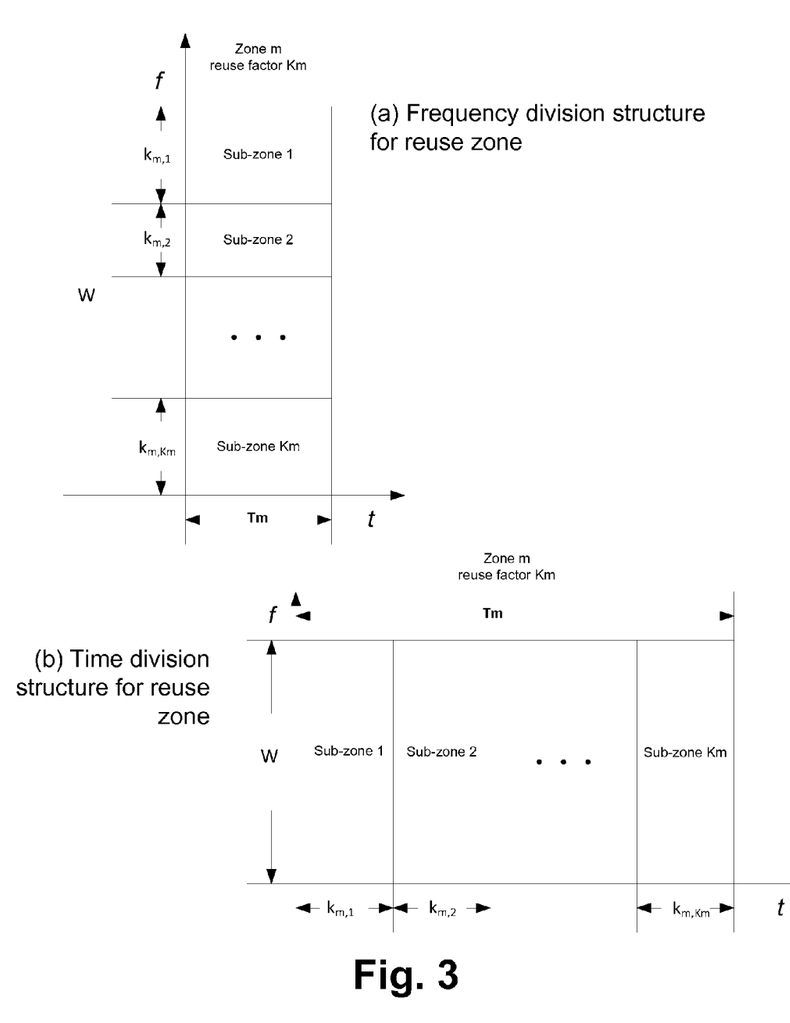
FIG. 3 is illustrating two kinds of structures of a reuse zone.

For each reuse zone, also two kinds of structures are defined, one is frequency division structure and the other is time division structure, shown in FIG. 3. The difference between the two structures is the allocating of sub-zones in frequency domain or time domain. In FIG. 3, it is assumed that the reuse factor of zone m is $K_m$, which means one should have $K_m$ sub-zones. For any sub-zone i in zone m, $k_{m,i}$ sub-channels have been allocated to it, where $i=1, \ldots, K_m$. These $k_{m,i}$ sub-channels can be allocated continually or discretely according to different allocating approaches.

Figure 4:
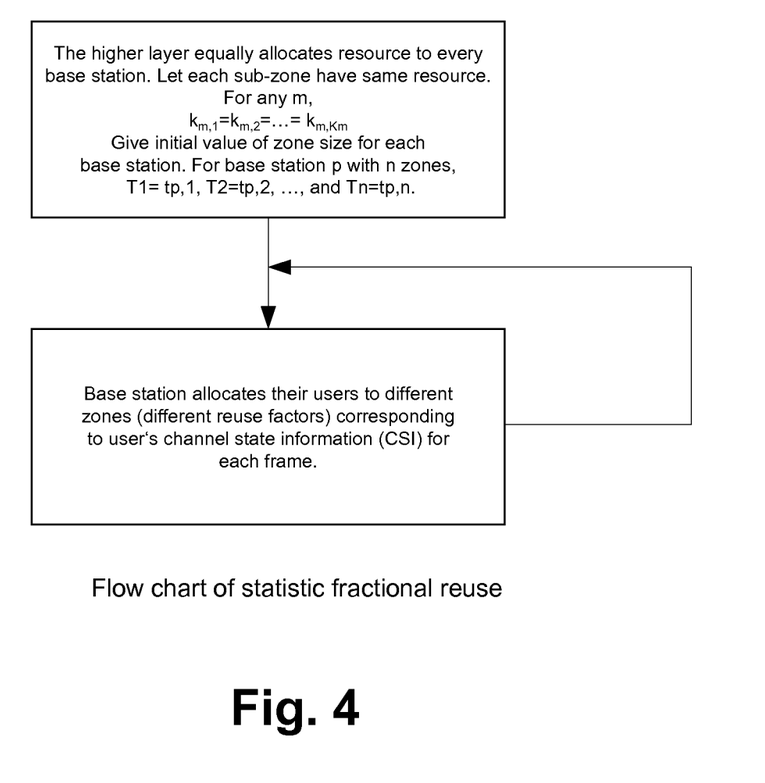
FIG. 4 is illustrating in a flow chart the static size or resource allocation.

FIG. 4 is showing the flow chart of static size or resource allocation. Two steps are provided in this method. Step 1: The higher network layer loads resource allocation information from database, and then informs each base station what resource has been allocated to them, respectively. This resource allocation information comes from long term statistical process and will update very slowly.

Step 2: Base station allocates its users to different zones according to channel state information, and then adds corresponding information to database for further update.

Figure 5:
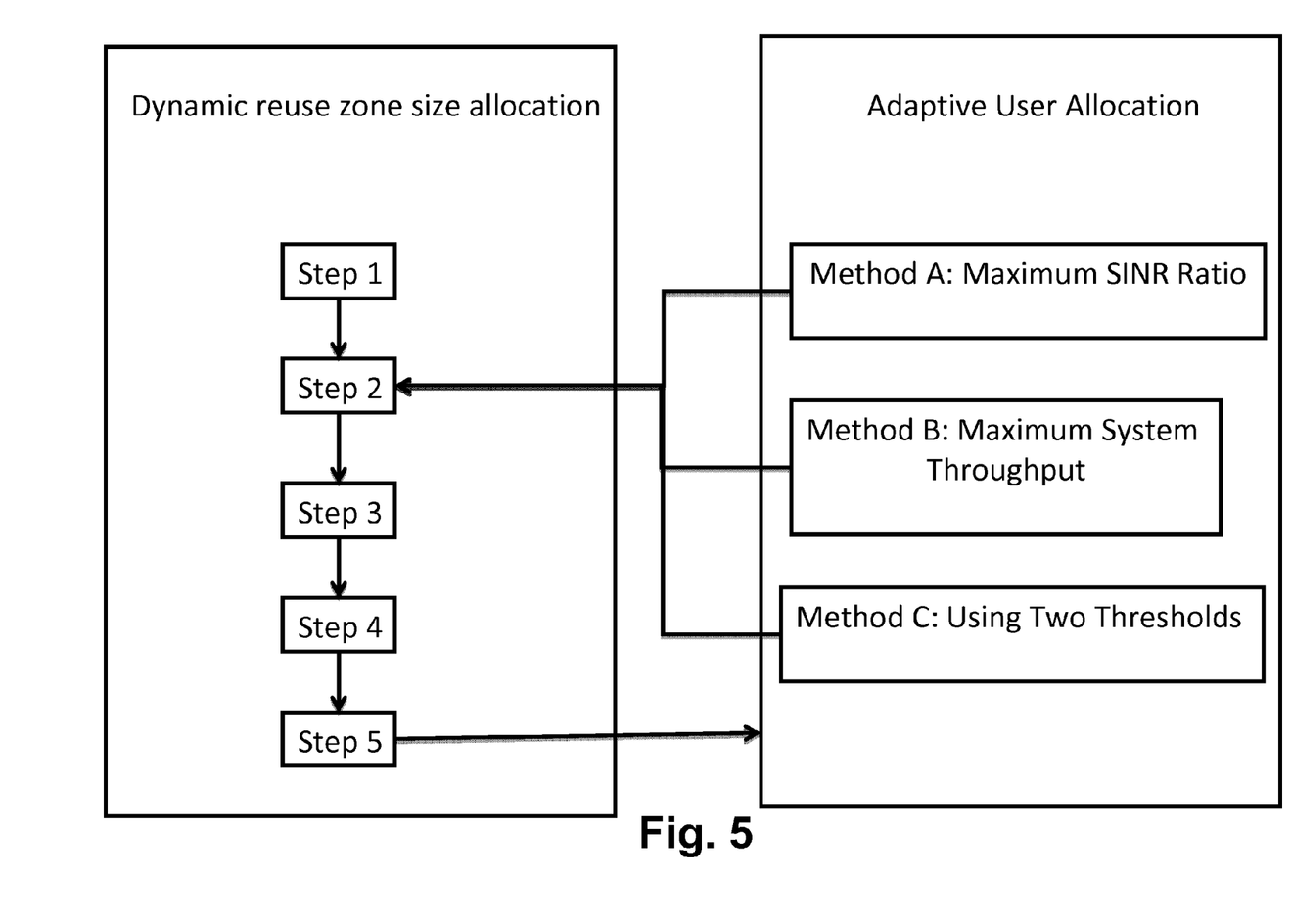
FIG. 5 is illustrating in a block diagram schematically the fully automated size or resource allocation together with the adaptive user allocation comprising three different procedures A, B and C, FIG. 6. is illustrating in a flow chart the dynamic reuse zone size or resource allocation.

FIG. 5 is illustrating a block diagram for fully automated resource or size allocation and optimisation for reuse zone size and user allocation. Within this dynamic FFR three methods A, B and C are proposed for adaptive user allocation.

Figure 6:
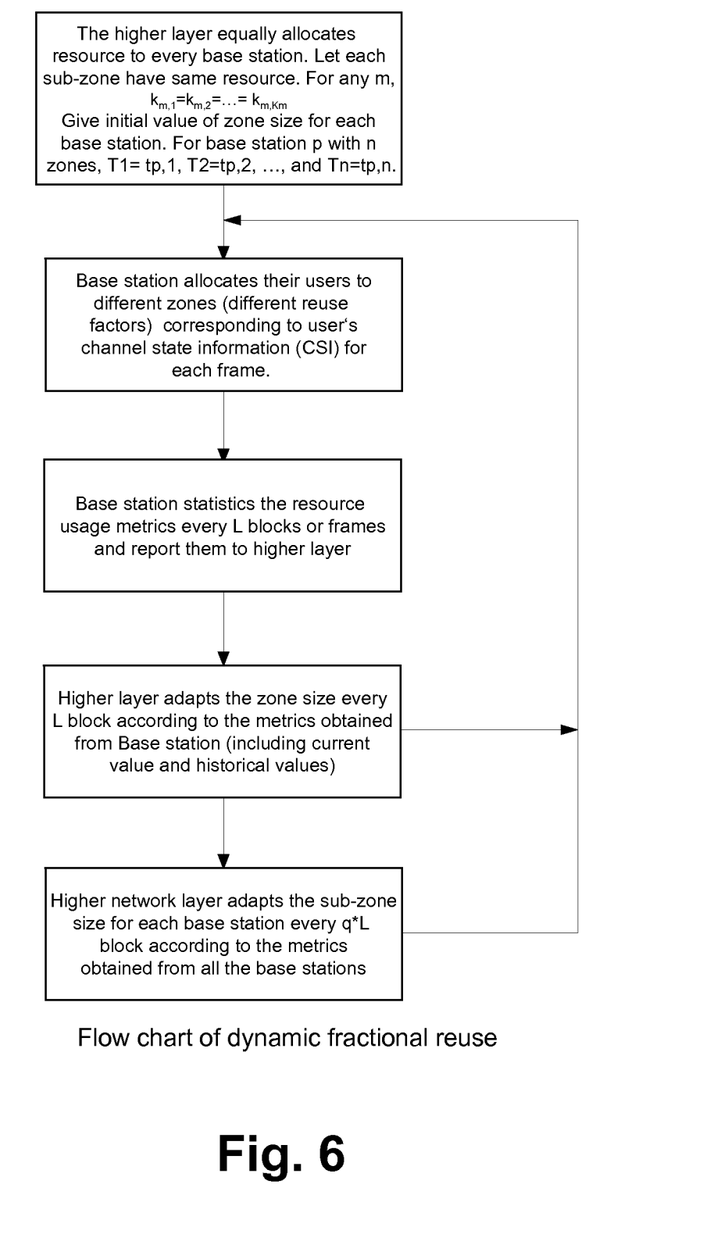

FIG. 6 is illustrating a flow chart of dynamic resource or size allocation. Mainly there are five steps in the dynamic allocation.

Step 1: The higher network layer loads resource allocation information from database, and then informs each base station what resource has been allocated to them, respectively. Normally, base stations are allocated equal sizes or resources, which means for zone j, $k_{j,1}=k_{j,2}=\ldots=k_{j,Kj}$, where $j=1, \ldots$.

Step 2: The base station allocates users to different zones. The optional users' allocation method is the adaptive user allocation. This user allocation approach firstly tries to classify users into n groups, and then allocates each group to corresponding zone. The detail of proposed adaptive user allocation approach will be discussed later.

Step 3: Base station statistics the resource usage metrics for each frame or block; and it reports the statistical results to higher network layer every $L^{th}$ block. The possible statistical variables may include: (1) $U_k$: number of users which have been allocated to zone k; (2) $V_k$: Number of users which are tried to be allocated to zone k by user allocation and which could be grouped to zone k. The value reported to higher network layer can be the average value of $U_k$ and $V_k$ across L blocks or frames, noted as $X_k$ and $Y_k$, respectively. 2n values need to be reported to higher network layer every L blocks.

Step 4: Higher network layer adapts the size of each zone according to current and historical value of metrics. Assume for time i, the current report value for zone k is $X_k(i)$ and $Y_k(i)$. Consider the scenario where only two zones are used. The reuse factor of zone one is 1 and reuse factor of zone two is 3.
   (a) For $i*L^{th}$ block, calculate the difference between average value of $S_k(i)=X_k(i)-Y_k(i)$;
   (b) Filter the reported metrics of current and previous D−1 value for each zone, $R_k(i)=A_0*S_k(i)+\ldots+A_{D-1}*S_k(i-D+1)$, where $A_0 \neq 0$ and if $D \geq 2$, for any j belongs to 1 to D−1, $A_j/A_0<1$;
   (c) Adapt zone size according to R value. The zone with smaller reuse factor always has higher priority to increase their size. If $R_1(i)>0$, increase the size of zone 1 by F symbols and decrease the size of zone 2 by F symbols; else if $R_2(i)>0$ increase the size of zone 2 by F symbols and decrease the size of zone 1 by F symbols. F is the step for each adjustment.

Step 5: Higher network layer adapts the sub-zone size every q*L block for every zone. q is an integer lager than or equal to one. To zone j with reuse factor Kj, Kj base stations need to be considered.
   (a) Calculate how many users request resource during q*L block for base station i, noted as $G_i$; and then compute how many users request resource during q*L block for all the related base station (Kj base stations), noted as Z;
   (b) Calculate the new size of sub-zones, for sub-zone p, its size defined as $k_{j,p}=G_p/Z*H$, where H is the total of sub-channels in frequency domain or time domain for one zone.

Figure 7:
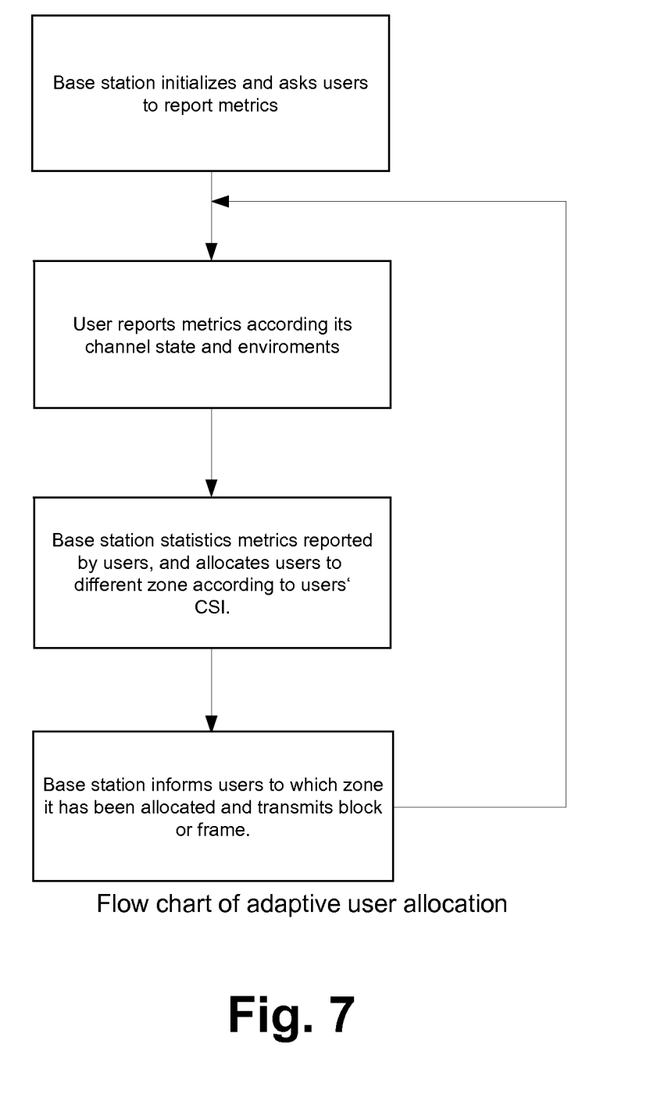
FIG. 7 is illustrating in a flow chart the adaptive user allocation.

FIG. 7 is showing in a flow chart an adaptive user allocation according to the invention. Users will be allocated into different reuse zones. There are four steps in the adaptive user allocation process.

Step 1: Base station asks users to report metrics via broadcast channel. These metrics may include the preamble carrier to interference and noise ratio of different zones.

Step 2: Users report the needed metrics to base station. This procedure can be achieved through uplink feedback channel.

Step 3: According to the reported value of metrics, base station allocates user to different zones. Here we supply an example for the scenario where only reuse one zone and reuse three zone are used. Three kinds of procedures can be used:
   Approach A: Maximum SINR Ratio
   (a) Calculate the metric: $r_i$=SINR1/SINR2
       Where, SINR1 is the estimate of the average CINR over all subcarriers of the preamble except the guard subcarriers and the DC subcarriers (In other words, the signal on the unmodulated subcarriers (except the guard subcarriers and the DC subcarriers) shall also be considered as noise and interference for the CINR estimate); SINR2 is the estimate of the average CINR over only the modulated subcarriers for the preamble.
   (b) If $r_i$<Th, then user i will be classified as group one, otherwise user i will be classified as group two. Users in group one will be tried to allocate to zone one with frequency reuse factor of 1, and users in group two will be tried to allocate to zone two with frequency reuse factor of 3; Th is a threshold and is defined as a constant value.
   (c) Sort users in group two by SINR2 in descending order, and then allocate these users to zone two from the user with highest SINR2. If all users in group two have been allocated, select user in group one with highest SINR2 and allocate it to zone two till all the resource in zone two has been used; If there are any users which have not been allocated resource, classify them to group one;
   (d) Sort users in group one by SINR1 in descending order, and then allocate them to zone one from the user with highest SINR1 until all users have been allocated resource or all the resource has been used up.
   Approach B: Maximum System Throughput
   (a) Classify user into group one if its SINR1$\geq$Th_SINR1, and the rest of the users are classified into group two, where Th_SINR1 is the minimum required SINR for using reuse factor one;
   (b) Allocate users in group one to zone one from the user with lowest CINR3. If there are any users which have not been allocated resource, add them to group two;
   (c) Allocate users in group two to zone two from the user with highest CINR3 until all the users have been allocated or the resource has been used up;

In the approach A and B, the QoS requirements for each user can also be considered as factor for the allocation.

Step 4: Base station informs users to which zones they have been allocated via head information or control channel, and then transmit whole block. The user decodes the head information to find the position of its own data.

Approach C: Multiple Thresholds Approach (Two Threshold Example Shown Below)

Figure 8:
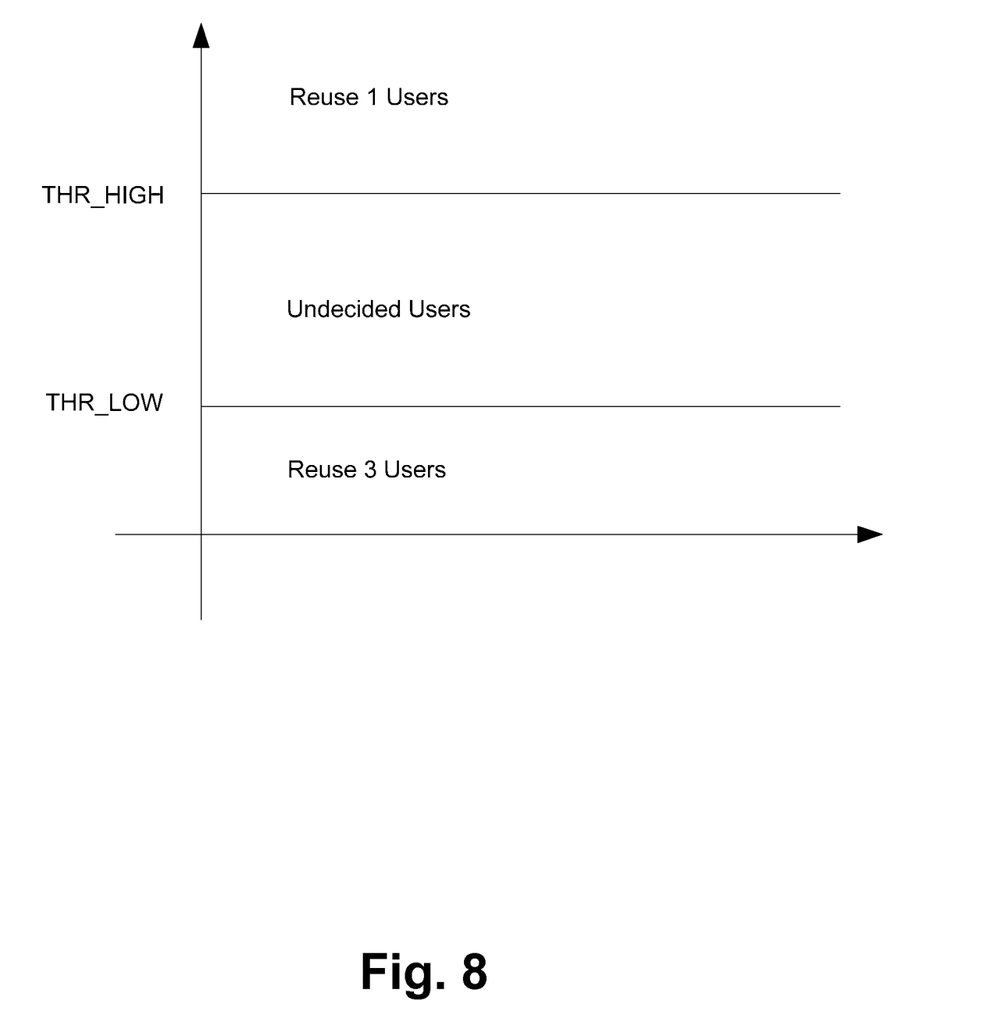
FIG. 8 is illustrating the multi-stage thresholds user allocation for FFR and FIG. 9 is illustrating in a flow chart multi-stage thresholds user allocation for FFR.

FIG. 8 is illustrating the idea of multi-stage thresholds user allocation for FFR. The key point of this proposal is to use two thresholds to allocate users to the corresponding reuse zones.

Figure 9:
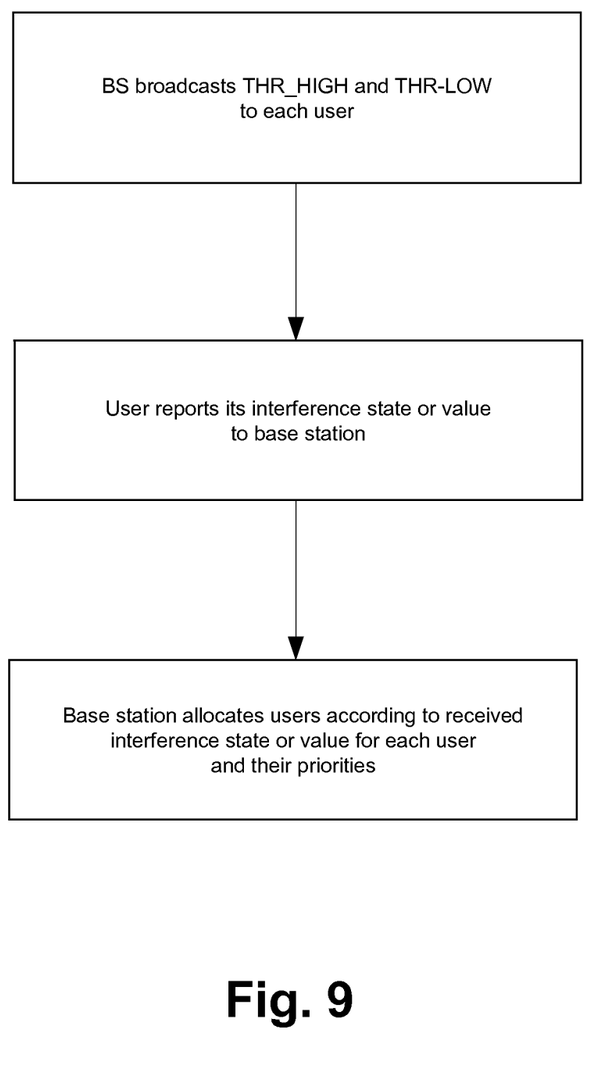

The major steps of the proposed user allocation algorithm for FFR in WiMAX environments are as follows, shown in FIG. 9 in the form of a flow chart of multi-stage thresholds user allocation for FFR:

(1) The base station BS broadcasts a high threshold (THR_HIGH) and a low threshold (THR_LOW) of selected metric to all users. The selected metric may be CINR1, which can reflect the received signals quality of each mobile station MS or user;

(2) The users, according to their values of selected metric, report their interference states to the base station. Here we propose two options to users to report their interference states to the base station:

Option 1: each user has three choices:
  a) Reporting metric state only; the metric state describes the scope of required metric. For example, it can indicate if the CINR1 is lower than the low threshold (THR_LOW), higher than the high threshold (THR_HIGH), or between THR_LOW and THR_HIGH;
  b) Reporting metric value only, such as CINR1. This mode is especially useful for the users with the value of metric between THR_LOW and THR_HIGH.
  c) Not reporting anything; if a user selects such method, the base station will regard the user has a very low value of the selected metric.

Option 2: each user has two choices, including above a) and b);

(3) The base station allocates users to different reuse zones according to their reported metric and QoS requirements; users are grouped into three catalogues. The users which do not send this information to base station have been classified as very low values of metric by the base station when traffics are needed for them; The procedure of allocating users is as follows:
  a) Allocate users with higher value of metric (greater than THR_HIGH) to reuse one zone; If the resource is not enough to allocate all such users, only allocate the users with the higher priority. The definition of priority may include QoS, fairness, etc.
  b) Allocate users with lower value of metric (less than THR_LOW) to reuse three zone. If the resource is not enough to allocate all such users, only allocate the users with the higher priority.
  c) Allocate rest of the users to remained resource. The first factor to be considered is priority. The users with higher priority will be first allocated and allocated to "better" resource. For example, if there is still remained reuse three resource, the users have higher priority should be allocated. The second factor is system throughput or coverage. From throughput's point of view, the users with higher value of metric will be allocated to "better" resource and from coverage's point of view the users with lower value of metric will be allocated to "better" resource.
  d) The users that cannot be compared by value of metric will be randomly allocated.

Benefits
(1) The users are allocated according to their interference conditions, therefore, the system throughputs or coverage can be improved;
(2) QoS has been considered in user allocation method; for bad channel conditions, the user with higher priority will be allocated to "better" resource, and its QoS can be achieved with higher probabilities;
(3) The required report information is reduced. Firstly, only one metric is needed reported from the users; secondly, three different report formats are supported according to their requirements which can reduce the throughput requirement of uplink reporting channel. For example, if the users just report their interference state, just few bits are needed for each user; and also, if a user has very low value of required metric, it can keep quiet and does not report to base station, but base station knows its interference state.
(4) Easy to implement, no very complexity action is needed.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed. Although specific terms are employed herein, they are used in a generic and descriptive sense only and not for purposes of limitation.

The invention claimed is:

1. A method for operating a multi-cell radio system, comprising a plurality of base stations, wherein different frequency reuse factors are used within different reuse zones of one cell by means of a fractional frequency reuse (FFR) scheme, comprising the following steps:

allocating a size or resource to the different reuse zones; and allocating users into different reuse zones, wherein a higher network layer loads a size or resource allocation information from a database, and then informs each base station what size or resource has been allocated to them, respectively, wherein at least one base station allocates users to different reuse zones, wherein said at least one base station asks users to report metrics, wherein the metrics include the preamble carrier to interference and noise ratio (CINR) of different zones, wherein the users report the metrics to the respective base stations, wherein said the at least one base station allocates the users to different zones according to the reported values of metrics, and wherein the user allocating step on the basis of two different reuse zones—zone one with a lower reuse factor and zone two with a higher reuse factor—comprises:

(a) calculating the metric $r_i$=SINR1/SINR2, where SINR1 is the estimate of the average CINR over all subcarriers of the preamble except the guard subcarriers and the DC subcarriers and SINR2 is the estimate of the average CINR over only the modulated subcarriers for the preamble, (b) classifying the users in two different groups, depending on the relation $r_i$<Th (group one) or $r_i \geq$ Th (group two), where Th is a definable threshold, (c) sorting users in group two by SINR2 in descending order, then allocating these users to zone two from the user with highest SINR2, then, if all users in group two have been allocated, selecting user in group one with highest SINR2 and allocating it to zone two till all the resource in zone two has been used and, if there are any users which have not been allocated resource, classifying them to group one, and (d) sorting users in group one by SINR1 in descending order, and then allocating them to zone one from the user with highest SINR1 until all users have been allocated resource or all the resource has been used up.

2. A method according to claim 1, wherein the QoS (Quality of Service) requirements for each user are also considered as factor for the allocation of users.

3. The method of claim 1, wherein,
the multi-cell radio system is an OFDMA-based radio system,
each base station allocates users to different reuse zones, preferably according to an adaptive user allocation method,
each base station asks users to report metrics, via broadcast channel,
the users report the metrics to the respective base stations, through uplink feedback channel, and
each base station allocates the users to different zones according to the reported values of metrics.

4. A method for operating a multi-cell radio system, comprising a plurality of base stations, wherein different frequency reuse factors are used within different reuse zones of one cell by means of a fractional frequency reuse (FFR) scheme, comprising the following steps:
allocating a size or resource to the different reuse zones; and
allocating users into different reuse zones, wherein a higher network layer loads a size or resource allocation information from a database, and then informs each base station what size or resource has been allocated to them, respectively,
wherein at least one base station allocates users to different reuse zones,
wherein said at least one base station asks users to report metrics,
wherein the metrics include the preamble carrier to interference and noise ratio (CINR) of different zones,
wherein the users report the metrics to the respective base stations,
wherein said at least one base station allocates the users to different zones according to the reported values of metrics, and
wherein the user allocating step on the basis of two different reuse zones—zone one with a lower reuse factor and zone two with a higher reuse factor—comprises:
(a) classifying users into group one if their $SINR1 \geq Th\_SINR1$, and the rest of the users into group two, where $Th\_SINR1$ is the minimum required SINR for using the lower reuse factor;
(b) allocating users in group one to zone one from the user with lowest CINR3 (CINR3 is the CINR for zone two) and, if there are any users which have not been allocated resource, adding them to group two; and
(c) allocating users in group two to zone two from the user with highest CINR3 until all the users have been allocated or the resource has been used up.

5. The method of claim 4, wherein,
the multi-cell radio system is an OFDMA-based radio system,
each base station allocates users to different reuse zones, according to an adaptive user allocation method,
each base station asks users to report metrics, via broadcast channel,
the users report the metrics to the respective base stations, through uplink feedback channel, and
each base station allocates the users to different zones according to the reported values of metrics.

6. A method for operating a multi-cell radio system, comprising a plurality of base stations, wherein different frequency reuse factors are used within different reuse zones of one cell by means of a fractional frequency reuse (FFR) scheme, comprising the following steps:
allocating a size or resource to the different reuse zones; and
allocating users into different reuse zones,
wherein a higher network layer loads a size or resource allocation information from a database, and then informs each base station what size or resource has been allocated to them, respectively,
wherein at least one base station allocates users to different reuse zones,
wherein said at least one base station asks users to report metrics,
wherein the metrics include the preamble carrier to interference and noise ratio (CINR) of different zones,
wherein the users report the metrics to the respective base stations,
wherein said at least one base station allocates the users to different zones according to the reported values of metrics, and
wherein the user allocating step on the basis of n different reuse zones—the reuse factor of the reuse zones is increasing from reuse zone one to reuse zone n—comprises:
1) all users are allocated to a user pool, and set reuse zone count N=1;
2) classify the users in the user pool into a group if their $SINR_N \geq Th\_SINR_N$, and leave the rest of users within the user pool temporarily, where $Th\_SINR_N$ is the minimum required SINR for using the reuse zone N;
3) if $N \leq n-1$, allocate users in the group to reuse zone N from the user with lowest $SINR_{N+1}$, where $SINR_{N+1}$ refers to SINR measurement for reuse zone N+1; if N=n, allocate users in the group to reuse zone N from the user with highest $SINR_N$ and if there are any users which have not been allocated resource, add them to user pool;
4) let N=N+1, and repeat step 2 and step 3 until N>n; when N>n, all the reuse zones have been considered, and this user allocation procedure is finished; if there are any users in user pool, these users will not be allocated resource in this procedure due to their poor channel conditions.

7. The method of claim 6, wherein,
the multi-cell radio system is an OFDMA-based radio system,
each base station allocates users to different reuse zones, according to an adaptive user allocation method,
each base station asks users to report metrics, via broadcast channel,
the users report the metrics to the respective base stations, through uplink feedback channel, and
each base station allocates the users to different zones according to the reported values of metrics.

8. A method for operating a multi-cell radio system, comprising a plurality of base stations, wherein different frequency reuse factors are used within different reuse zones of one cell by means of a fractional frequency reuse (FFR) scheme, comprising the following steps:
allocating a size or resource to the different reuse zones; and
allocating users into different reuse zones,
wherein a higher network layer loads a size or resource allocation information from a database, and then informs each base station what size or resource has been allocated to them, respectively,
wherein at least one base station allocates users to different reuse zones, wherein said at least one base station asks users to report metrics, wherein the metrics include the preamble carrier to interference and noise ratio (CINR) of different zones, wherein the users report the metrics to the respective base stations, wherein said at least one base station allocates the users to different zones according to the reported values of metrics, wherein a multiple threshold user allocation method is used, and wherein the user allocating step on the basis of two thresholds and at least two different reuse zones—zone one with a lower reuse factor and zone two with a higher reuse factor—comprises the following steps:

(1) said at least one base station broadcasts a high threshold (THR_HIGH) and a low threshold (THR_LOW) of selected metric to all users, where the selected metric may be CINR1, which can reflect the received signals quality of each user;

(2) the users, according to their values of selected metric, report their interference states or value to the base station, wherein two options are possible for the users to report their interference states to the base station:

option 1: each user has three choices:
a) reporting metric state only, where the metric state describes the scope of required metric;
b) reporting metric value only, such as CINR1; or
c) not reporting anything; and
option 2: each user has two choices, including above a) and b); and (3) said at least one base station allocates the users to different reuse zones according to received interference state or their reported metric or value requirements.

9. A method according to claim 8, wherein the procedure of allocating the users comprises:

a) allocating users with higher value of metric (greater than THR_HIGH) to reuse zone one and, if the resource is not enough to allocate all such users, only allocating the users with a higher priority, where the definition of priority may include QoS, and fairness, b) allocating users with lower value of metric (less than THR_LOW) to reuse zone two and, if the resource is not enough to allocate all such users, only allocating the users with the higher priority, and c) allocating the rest of users to remained resource, and d) randomly allocating the users that cannot be compared by value of metric.

10. A method according to claim 9, wherein in step c), the allocating of the rest of users to remained resource is where the first factor to be considered is priority and the second factor is system throughput or coverage.

11. A method according to claim 8, wherein the users which do not report their interference states or value to the base station are classified as very low values of metric by the base station.

12. The method of claim 8, wherein, the multi-cell radio system is an OFDMA-based radio system, each base station allocates users to different reuse zones, according to an adaptive user allocation method, according to an adaptive user allocation method, each base station asks users to report metrics, via broadcast channel, the users report the metrics to the respective base stations, through uplink feedback channel, and each base station allocates the users to different zones according to the reported values of metrics.

13. The method of claim 12, wherein, in option 1, each user has three choices:
a) reporting metric state only, where the metric state describes the scope of required metric and can indicate if the CINR1 is lower than the low threshold (THR_LOW), higher than the high threshold (THR_HIGH), or between THR_LOW and THR_HIGH;
b) reporting metric value only, such as CINR1; or
c) not reporting anything; and
option 2: each user has two choices, including above a) and b); and (3) said at least one base station allocates the users to different reuse zones according to received interference state or their reported metric or value and QoS requirements.

14. A multi-cell radio system, the system comprising a plurality of base stations, wherein different frequency reuse factors are used within different reuse zones of one cell by means of a fractional frequency reuse (FFR) scheme, wherein a size or resource is allocated to the different reuse zones and users are allocated into different reuse zones and wherein a block or frame structure suitable for fractional frequency reuse (FFR) is defined, said system configured to operate the multi-cell radio system, through the following steps:

allocating a size or resource to the different reuse zones; and allocating users into different reuse zones, wherein a higher network layer loads a size or resource allocation information from a database, and then informs each base station what size or resource has been allocated to them, respectively, wherein at least one base station allocates users to different reuse zones, wherein said at least one base station asks users to report metrics, wherein the metrics include the preamble carrier to interference and noise ratio (CINR) of different zones, wherein the users report the metrics to the respective base stations, wherein said at least one base station allocates the users to different zones according to the reported values of metrics, and wherein the user allocating step on the basis of two different reuse zones—zone one with a lower reuse factor and zone two with a higher reuse factor—comprises:

(a) calculating the metric $ri=SINR1/SINR2$, where SINR1 is the estimate of the average CINR over all subcarriers of the preamble except the guard subcarriers and the DC subcarriers and SINR2 is the estimate of the average CINR over only the modulated subcarriers for the preamble, (b) classifying the users in two different groups, depending on the relation $ri<Th$ (group one) or $ri \geq Th$ (group two), where Th is a definable threshold, (c) sorting users in group two by SINR2 in descending order, then allocating these users to zone two from the user with highest SINR2, then, if all users in group two have been allocated, selecting user in group one with highest SINR2 and allocating it to zone two till all the resource in zone two has been used and, if there are any users which have not been allocated resource, classifying them to group one, and (d) sorting users in group one by SINR1 in descending order, and then allocating them to zone one from the user with highest SINR1 until all users have been allocated resource or all the resource has been used up.

15. A multi-cell radio system, the system comprising a plurality of base stations, wherein different frequency reuse factors are used within different reuse zones of one cell by means of a fractional frequency reuse (FFR) scheme, wherein a size or resource is allocated to the different reuse zones and users are allocated into different reuse zones and wherein a block or frame structure suitable for fractional frequency reuse (FFR) is defined, said system configured to operate the multi-cell radio system, through the following steps:

allocating a size or resource to the different reuse zones; and allocating users into different reuse zones, wherein a higher network layer loads a size or resource allocation information from a database, and then informs each base station what size or resource has been allocated to them, respectively, wherein at least one base station allocates users to different reuse zones, wherein said at least one base station asks users to report metrics, wherein the metrics include the preamble carrier to interference and noise ratio (CINR) of different zones, wherein the users report the metrics to the respective base stations, wherein said at least one base station allocates the users to different zones according to the reported values of metrics, and wherein the user allocating step on the basis of two different reuse zones—zone one with a lower reuse factor and zone two with a higher reuse factor—comprises:

(a) classifying users into group one if their SINR1≧Th_SINR1, and the rest of the users into group two, where Th_SINR1 is the minimum required SINR for using the lower reuse factor;

(b) allocating users in group one to zone one from the user with lowest CINR3 (CINR3 is the CINR for zone two) and, if there are any users which have not been allocated resource, adding them to group two; and (c) allocating users in group two to zone two from the user with highest CINR3 until all the users have been allocated or the resource has been used up.

16. A multi-cell radio system, the system comprising a plurality of base stations, wherein different frequency reuse factors are used within different reuse zones of one cell by means of a fractional frequency reuse (FFR) scheme, wherein a size or resource is allocated to the different reuse zones and users are allocated into different reuse zones and wherein a block or frame structure suitable for fractional frequency reuse (FFR) is defined, said system configured to operate the multi-cell radio system, through the following steps:

allocating a size or resource to the different reuse zones; and allocating users into different reuse zones, wherein a higher network layer loads a size or resource allocation information from a database, and then informs each base station what size or resource has been allocated to them, respectively, wherein at least one base station allocates users to different reuse zones, wherein said at least one base station asks users to report metrics, wherein the metrics include the preamble carrier to interference and noise ratio (CINR) of different zones, wherein the users report the metrics to the respective base stations, wherein said at least one base station allocates the users to different zones according to the reported values of metrics, and wherein the user allocating step on the basis of n different reuse zones—the reuse factor of the reuse zones is increasing from reuse zone one to reuse zone n—comprises:

1) all users are allocated to a user pool, and set reuse zone count N=1;

2) classify the users in the user pool into a group if their $SINR_N \geq Th\_SINR_N$, and leave the rest of users within the user pool temporarily, where $Th\_SINR_N$ is the minimum required SINR for using the reuse zone N;

3) if N≦n−1, allocate users in the group to reuse zone N from the user with lowest $SINR_{N+1}$, where $SINR_{N+1}$ refers to SINR measurement for reuse zone N+1; if N=n, allocate users in the group to reuse zone N from the user with highest $SINR_N$ and if there are any users which have not been allocated resource, add them to user pool;

4) let N=N+1, and repeat step 2 and step 3 until N>n; when N>n, all the reuse zones have been considered, and this user allocation procedure is finished; if there are any users in user pool, these users will not be allocated resource in this procedure due to their poor channel conditions.

17. A multi-cell radio system, the system comprising a plurality of base stations, wherein different frequency reuse factors are used within different reuse zones of one cell by means of a fractional frequency reuse (FFR) scheme, wherein a size or resource is allocated to the different reuse zones and users are allocated into different reuse zones and wherein a block or frame structure suitable for fractional frequency reuse (FFR) is defined, said system configured to operate the multi-cell radio system, through the following steps:

allocating a size or resource to the different reuse zones; and allocating users into different reuse zones, wherein a higher network layer loads a size or resource allocation information from a database, and then informs each base station what size or resource has been allocated to them, respectively, wherein at least one base station allocates users to different reuse zones, wherein said at least one base station asks users to report metrics, wherein the metrics include the preamble carrier to interference and noise ratio (CINR) of different zones, wherein the users report the metrics to the respective base stations, wherein said at least one base station allocates the users to different zones according to the reported values of metrics, wherein a multiple threshold user allocation method is used, and wherein the user allocating step on the basis of two thresholds and at least two different reuse zones—zone one with a lower reuse factor and zone two with a higher reuse factor—comprises the following steps:

(1) said at least one base station broadcasts a high threshold (THR_HIGH) and a low threshold (THR_LOW) of selected metric to all users, where the selected metric may be CINR1, which can reflect the received signals quality of each user;

(2) the users, according to their values of selected metric, report their interference states or value to the base station, wherein two options are possible for the users to report their interference states to the base station:

option 1: each user has three choices:
a) reporting metric state only, where the metric state describes the scope of required metric;
b) reporting metric value only, such as CINR1; or
c) not reporting anything; and option 2: each user has two choices, including above a) and b); and (3) said at least one base station allocates the users to different reuse zones according to received interference state or their reported metric or value requirements.

* * * * *

UNITED STATES PATENT AND TRADEMARK OFFICE
CERTIFICATE OF CORRECTION

PATENT NO.       : 8,442,002 B2
APPLICATION NO.  : 13/062528
DATED            : May 14, 2013
INVENTOR(S)      : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 212 days.

Signed and Sealed this

Eighth Day of September, 2015

Michelle K. Lee
*Director of the United States Patent and Trademark Office*